(12) United States Patent
Kato

(10) Patent No.: US 11,176,721 B2
(45) Date of Patent: Nov. 16, 2021

(54) MULTIPLEX PIXEL DISTRIBUTION FOR MULTI-MACHINE RENDERING

(71) Applicant: DreamWorks Animation LLC, Glendale, CA (US)

(72) Inventor: Toshiaki Kato, Irvine, CA (US)

(73) Assignee: DreamWorks Animation LLC, Glendale, CA (US)

(*) Notice: Subject to any disclaimer, the term of this patent is extended or adjusted under 35 U.S.C. 154(b) by 0 days.

(21) Appl. No.: 16/864,039

(22) Filed: Apr. 30, 2020

(65) Prior Publication Data

US 2021/0027509 A1 Jan. 28, 2021

Related U.S. Application Data

(60) Provisional application No. 62/878,679, filed on Jul. 25, 2019.

(51) Int. Cl.
*G06T 11/60* (2006.01)

(52) U.S. Cl.
CPC .......... *G06T 11/60* (2013.01); *G06T 2200/24* (2013.01); *G06T 2210/52* (2013.01)

(58) Field of Classification Search
None
See application file for complete search history.

(56) References Cited

U.S. PATENT DOCUMENTS

2016/0148424 A1* 5/2016 Chung .................... G06T 11/40
345/423

OTHER PUBLICATIONS

Kensler et al., "Correlated Multi-Jittered Sampling", Pixar Technical Memo, XP55733314, Mar. 2013, 8 pages.
(Continued)

*Primary Examiner* — Frank S Chen
(74) *Attorney, Agent, or Firm* — Lee, Hong, Degerman, Kang & Waimey

(57) ABSTRACT

A method of controlling rendering of a computer image at a plurality of computers includes: controlling a first computer of the plurality of computers to identify a pixel of a tile of the computer image, wherein the identification of the pixel is based on an inter-pixel order; controlling the first computer to identify one or more locations of the pixel, to facilitate sampling of the pixel at the one or more locations thereof, wherein the identification of the one or more locations is based on an intra-pixel computational order corresponding to the first computer; and receiving rendering results corresponding to the one or more locations of the pixel.

19 Claims, 5 Drawing Sheets

(56) References Cited

OTHER PUBLICATIONS

Unknown, "Renderman21 documentation: Section: Sampling Modes", XP55733576, Mar. 2018, 5 pages.
Christensen, et al., "Progressive Multi-Jittered Sample Sequences", Computer Graphics Forum: Journal of the European Association for Computer Graphics, vol. 37 (2018), Jul. 2018, No. 4, Pixar Animation Studios, XP55738319, 13 pages.
Farrugia, et al., "A Progressive Rendering Algorithm Using an Adaptive Perceptually Based Image Metric", Computer Graphics Forum: Journal of the European Association for Computer Graphics, XP55738346, Apr. 2004, 15 pages.
Samanta et al., "Hybrid Sort-First and Sort-Last Parallel Rendering with a Cluster of PCs", Aug. 2000, XP58283964, 12 pages.
Bergman, et al., "Image Rendering by Adaptive Refinement", Computer Graphics and Interactive Techniques, vol. 20, No. 4, Aug. 1986, Dallas, 9 pages.
European Patent Office Application Serial No. 20187474.0, Search Report dated Nov. 24, 2020, 12 pages.

* cited by examiner

MULTIPLEX PIXEL DISTRIBUTION FOR MULTI-MACHINE RENDERING

CROSS-REFERENCE TO RELATED APPLICATION(S)

Pursuant to 35 U.S.C. § 119(e), this application claims the benefit of U.S. Provisional Patent Application No. 62/878,679, filed Jul. 25, 2019, the contents of which are hereby incorporated by reference herein in its entirety.

BACKGROUND

A computer-generated animation is typically created by rendering a sequence of images, with each image depicting a computer-generated scene composed of one or more computer-generated assets (e.g., a character, a group of characters, an environment, an effect, or a lighting rig). During an interactive session for rendering a scene, an artist may use one or more tools to change aspects or conditions of the scene. For example, a lighting artist may use a lighting tool to change conditions of the scene. According to the changes initiated by the artist, each of one or more rendering engines may render an image depicting the scene and send intermediate snapshots of the rendering results to a front-end client. These intermediate snapshots may be sent at particular time intervals. The front-end client controls a display of the snapshots, e.g., at a monitor. The artist may then evaluate progressive results of the changes that he or she had initiated, as the scene is rendered.

Rendering a computer graphics image at high resolution and complexity may be computationally expensive. For example, an artist may view such images at a front-end client (e.g., computer workstation). If computational work for rendering the images is performed at only the computer workstation being used by the artist, the speed of rendering is limited by the computational power of that workstation. To improve computational speed relating to rendering images, one or more back-end rendering engines (e.g., back-end farm computers) may be employed in the rendering process. In this situation, results of rendering an image are sent to the front-end client, e.g., over a communication interface. This may accelerate the presentation of rendered images at the front-end client, so that the artist is able to view, more quickly, results of changes he or she had initiated.

SUMMARY

Aspects of the present disclosure are directed to controlling a distribution of image rendering tasks to a plurality of rendering engines. According to one or more embodiments, each rendering engine is controlled to perform computations for a pixel according to a corresponding intra-pixel computational sequence. This may achieve a better load balancing in the context of parallel computing, for example, when multiple rendering engines are working to address respective problems of unequal complexity.

The issue of load balancing may become more acute, for example, when different computers hosting the rendering engines may not necessarily be homogenous.

Although features of embodiments of the present invention may be described, for purposes of illustration, within the context of an interactive lighting session in a computer animation environment, it is understood that described features are by no means limited to this context and may be applied in other contexts within the computer arts.

According to at least one embodiment, a method of controlling rendering of a computer image at a plurality of computers includes: controlling a first computer of the plurality of computers to identify a pixel of a tile of the computer image, wherein the identification of the pixel is based on an inter-pixel order; controlling the first computer to identify one or more locations of the pixel, to facilitate sampling of the pixel at the one or more locations thereof, wherein the identification of the one or more locations is based on an intra-pixel computational order corresponding to the first computer; and receiving rendering results corresponding to the one or more locations of the pixel.

According to at least one embodiment, a machine-readable non-transitory medium storing machine-executable instructions for controlling rendering of a computer image at a plurality of computers is disclosed. The instructions include: controlling a first computer of the plurality of computers to identify a pixel of a tile of the computer image, wherein the identification of the pixel is based on an inter-pixel order; controlling the first computer to identify one or more locations of the pixel, to facilitate sampling of the pixel at the one or more locations thereof, wherein the identification of the one or more locations is based on an intra-pixel computational order corresponding to the first computer; and receiving rendering results corresponding to the one or more locations of the pixel.

According to at least one embodiment, a system for controlling rendering of a computer image at a plurality of computers is disclosed. The system includes one or more controllers configured to: control a first computer of the plurality of computers to identify a pixel of a tile of the computer image, wherein the identification of the pixel is based on an inter-pixel order; control the first computer to identify one or more locations of the pixel, to facilitate sampling of the pixel at the one or more locations thereof, wherein the identification of the one or more locations is based on an intra-pixel computational order corresponding to the first computer; and receive rendering results corresponding to the one or more locations of the pixel.

BRIEF DESCRIPTION OF THE DRAWINGS

The above and other aspects and features of the present disclosure will become more apparent upon consideration of the following description of embodiments, taken in conjunction with the accompanying figures.

DETAILED DESCRIPTION

In the following detailed description, reference is made to the accompanying figures which form a part hereof, and which show by way of illustration specific embodiments of the present invention. It is to be understood by those of ordinary skill in the technological field of computer animation and other computer modeling applications that other embodiments may be utilized, and that structural, electrical, as well as procedural changes may be made without departing from the scope of the present invention. Wherever possible, the same reference numbers will be used throughout the drawings to refer to the same or similar parts.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Figure 1:
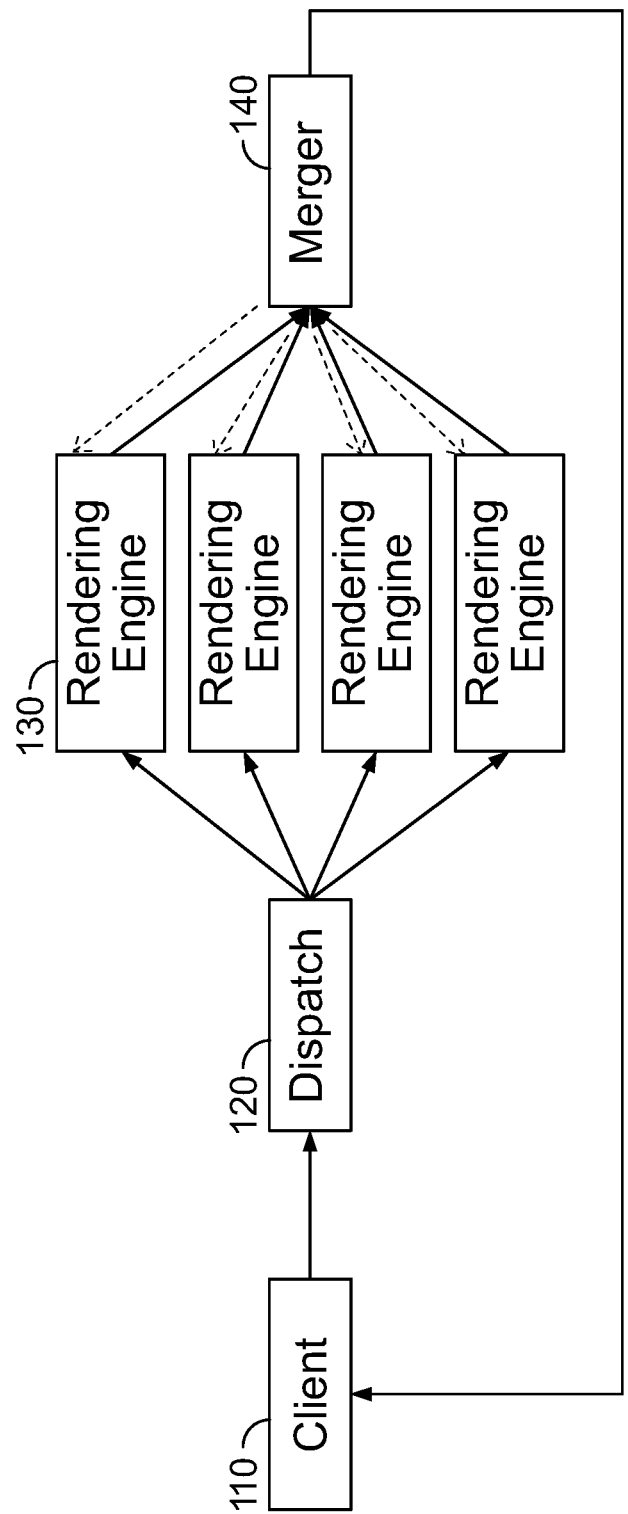
FIG. 1 is a block diagram illustrating operation by a plurality of rendering processes according to least one embodiment.

With reference to FIG. 1, during an interactive rendering session, a client (e.g., front-end client 110) provides inputs to a dispatch 120. The inputs may include, e.g., changes initiated by an artist. For example, the changes may be provided during the session, which may be an interactive lighting session. The dispatch 120 provides the inputs to each of the rendering engines 130. The rendering engines 130 may reside on one or more hosts that are separate from the front-end client 110. For example, the rendering engines 130 may all reside on different hosts (e.g., different remote computers). The inputs are collectively processed by the rendering engines 130. According to at least one embodiment, the rendering engines 130 are independent entities that may be employed to collectively render a single (or same) image.

Each of the rendering engines 130 generates results. For example, different rendering engines 130 may provide results for different pixels. As another example, according to at least one embodiment, different rendering engines 130 may, at or around a particular time, provide results for a same pixel. In this regard, according to at least one embodiment, two or more of the rendering engines 130 may sample a same pixel, but at different locations. At a given time, results generated by the rendering engines 130 are merged (e.g., by a merger 140) to produce a merged result. For example, at a particular interval (e.g., an artist-selected interval), each rendering engine 130 provides its results to the merger 140. The merger 140 combines the results from the rendering engines 130 into a single image for display. The merged result is provided to the front-end client 110 (or saved in storage for later viewing). The front-end client 110 may control a display, e.g., an external monitor, to display snapshots of the merged result. As such, the artist may evaluate progressive results of the changes that he or she had initiated.

As described earlier, the dispatch 120 provides the inputs to each of the rendering engines 130. For example, duplicates of the inputs are sent to every rendering engine 130. Accordingly, each of the rendering engines 130 has (e.g., in its own or corresponding memory storage) an exact (or the same) copy of the scene to be rendered.

As also described earlier, different rendering engines 130 may concurrently provide results for a same pixel of an image depicting the scene. With respect to a particular pixel of an image, the rendering engines 130 may continually render the scene by tracing rays (e.g., an increasing number of rays) into the pixel in order to point sample a high-order continuous signal. The more samples that are traced into the pixel, the more the computed color of the resulting pixel will approximate the correct final color (also referred to as the "ground truth").

As will be described in more detail below, embodiments of the present invention are distinguishable from approaches in which tiles (e.g., blocks of pixels that may individually be, for example, 8 pixels by 8 pixels in dimension) are assigned to rendering processes (e.g., rendering engines 130) in a round-robin (or similar) fashion, where each rendering process is assigned a different tile to render. In such approaches, an image that is rendered via an interactive loop or process characteristically results in individual tiles appearing on a display according to some pattern, as the rendering for each individual tile is completed (or performed). Effectively, the artist is given an impression that the image is being incrementally built by tiles (or blocks of tiles).

According to various embodiments of the present invention, an image is collectively rendered by a plurality of computers (e.g., computers at which rendering engines 130 respectively reside). For example, according to at least one embodiment, an image may consist of a number of tiles, and the tiles that are to be rendered by a particular computer are selected (or determined) based on a corresponding sequential order. Such an order may be referenced as an inter-tile order. The inter-tile order may be a random order that is generated, e.g., by random shuffling. In an aspect, the random order may be a random sequence generated using a seed value that corresponds to the process ID unique to a particular computer or rendering engine. Since the process IDs are unique, the randomly generated sequences would also be unique. In addition (or alternatively), pixels within a tile that are to be sampled (e.g., computed) by a particular computer are selected (or determined) based on a corresponding sequential order. Such an order may be referenced as an inter-pixel order. For example, pixels of a particular tile may be sampled based on the sequential order. Similar to the inter-tile order, the inter-pixel order may be a random order that is generated, e.g., by random shuffling. Similar to the random order used for tile selection, the random order used to determine the inter-pixel order may be generated using a seed value corresponding to the process ID unique to the particular computer or rendering engine. Accordingly, a sequential order according to which pixels are to be processed by the particular computer is made random. The features described in this paragraph may be applied to each of two or more computers (e.g., two or more rendering engines 130).

Furthermore, with respect to (or in the context of) individual pixels, according to at least one embodiment, a particular computer is controlled to perform computations for each pixel according to an intra-pixel computational sequence (or intra-pixel sequence). The intra-pixel computational sequence may provide, for example, a sequence of locations in or at which the computer samples the pixel over time. According to at least one embodiment, no two computers will render the pixel in exactly the same manner. This may provide the artist with a well-distributed initial sampling, and generally provide a more uniform update speed of all pixels across the entire image, rather than a tile-based concentration of samples. Features of one or more embodiments will be described herein with reference to multi-machine rendering. However, it is understood that such features can be applied in other rendering contexts, including single-machine rendering.

Accordingly, in at least one embodiment, each rendering engine (or host) renders an entire image, based on samples in distinct locations for each pixel of the image. As noted earlier, the distinct locations at which a particular rendering engine performs sampling may be specified by an intra-pixel computational sequence. The intra-pixel computational sequence may correspond specifically to that particular rendering engine. A merge process may then combine rendering results received from the multiple rendering engines into a single image that is to be viewed by the artist. Accordingly, the image may be displayed in a manner such that a quality of the displayed image progressively improves over time, without exhibiting characteristics of a tile-pattern sweep appearing around a display, as if the image were being incrementally built by tiles (or blocks of tiles). The results produced by all (or at least some of) the total number of rendering engines contribute to an overall image in a more well-distributed manner.

As will be described in more detail later with reference to at least one embodiment, the rendering engines do not themselves utilize computing resources (e.g., computation time) in determining stopping conditions with respect to processing one or more pixels. Rather, according to at least one embodiment, that determination is performed on behalf of the rendering engines by the merge process.

According to at least one embodiment, each rendering engine samples a particular pixel in distinct locations based on a random sequence. According to at least one particular embodiment, a unique random sequence is independently generated for each rendering engine. The unique random sequence may be generated based on the process ID associated with the rendering engine, for example, and each rendering engine may have a unique process ID. As such, if the number of rendering engines is equal to 100, then a total of 100 unique random sequences are generated. Each of the random sequences is different from and independent of the other random sequences.

According to at least another embodiment, the unique random sequences may be generated based on a common seed. For example, a common seed may be used to produce a single random sequence. A particular rendering engine may access selected values of the single random sequence in an interleaved fashion based, for example, on a value (or offset) corresponding to the rendering engine. For example, the value (or offset) may match a process identifier (process ID) of the rendering engine. The rendering engine samples a particular pixel in distinct locations based on the accessed subset of the values of the single random sequence. If different rendering engines are controlled to access different subsets of values of the single random sequence, then each subset of values may effectively constitute a unique random sequence. In this manner, values of multiple unique random sequences are effectively interleaved across values of a single random sequence, where the single random sequence may have been generated based on a common seed.

Operations for performing rendering of an image according to at least one embodiment will now be described in more detail with continued reference to FIG. 1 and also with reference to FIG. 2. The operations will be described with reference to a given rendering engine (e.g., a specific rendering engine 130 of FIG. 1). However, it is understood that similar operations may apply to one or more other rendering engines (e.g., other rendering engines 130 of FIG. 1).

Upon receiving inputs (e.g., from dispatch 120), the rendering engine begins rendering operations based on the received inputs. The rendering operations may first be performed by identifying a particular tile of the image. The particular tile may be identified by a first (or initial) value of a sequential order, e.g., an inter-tile order that may be generated, as noted earlier, by random shuffling. For example, an identifier of the tile may be equal to the first value of the inter-tile order. This particular tile identified by the rendering engine may, by chance, also be identified by another rendering engine for performing rendering operations. Also, the particular tile may be different from tiles identified by other rendering engines for performing rendering operations. In this manner, when rendering operations are first performed by different rendering engines, the rendering operations may be collectively performed across different tiles of the image. Therefore, the rendering engines can provide contributions to the overall image in a more distributed manner.

After identifying the particular tile, the rendering engine may identify a particular pixel of the tile. The particular pixel may be identified by a first (or initial) value of a sequential order, e.g., an inter-pixel order that may be generated, as noted earlier, by random shuffling. The rendering engine may then begin performing rendering computations on the identified pixel.

As described earlier, the particular tile identified by the rendering engine may, by chance, also be identified by another rendering engine for performing rendering operations. In this situation, both rendering engines, also by chance, may identify the same pixel of the same tile. However, the probability that both rendering engines identify an identical pixel of the same tile may be relatively small. For example, assuming a discrete uniform probability distribution, the probability that both rendering engines identify an identical pixel from a tile formed by an array of 8×8 pixels is equal to $1/64$. Therefore, it is more likely that two rendering engines identifying a same tile would identify different pixels of the tile. In this manner, when rendering operations are first performed by such rendering engines, the rendering operation may quite likely be collectively performed across different pixels of the same tile.

As also described earlier, the particular tile identified by the rendering engine may be different from tiles identified by other rendering engines for performing rendering operations. When different rendering engines are performing rendering operations on different tiles (e.g., different tiles that are non-overlapping), the rendering engines are necessarily performing such operations on different pixels of the image.

After identifying both the particular tile and the particular pixel, the rendering engine begins sampling the pixel in one or more distinct locations. According to at least one embodiment, if the rendering engine is to sample the pixel at only one particular location, then that location may simply be randomly chosen from a set (or subset) of potential locations.

According to at least one embodiment, if the rendering engine is to sample the pixel at one or more particular locations, the specific locations may be identified based on a random sequence of values. In this regard, respective values that form the random sequence may identify various locations, with each value identifying a corresponding location.

Example embodiments will now be described, by way of example, with reference to using a random sequence for identifying specific locations, e.g., pixel locations within a Monte Carlo rendering of single-camera ray computation. However, it is understood that such a random sequence may be used in the context of image rendering for conveying information other than (or in addition to) such pixel locations. For example, if a camera ray hits a diffuse surface, Monte Carlo rendering may use a bounce ray at the diffuse surface. The direction of the bounce ray direction may be randomly chosen using one or more random sequences.

As described earlier with reference to at least one particular embodiment, the specific sampling locations within a pixel may be identified based on a unique random sequence that is generated specifically for the rendering engine. This random sequence is different from and independent of random sequences generated for other rendering engines.

As also described earlier with reference to at least another embodiment, the specific sampling locations within a pixel may be identified based on a random sequence that is effectively generated based on a common seed. For example, if different rendering engines are controlled to access different subsets of values of a common random sequence, then each subset of values may effectively constitute a unique random sequence. In this manner, values of multiple unique random sequences are effectively interleaved across values of a common random sequence.

Figure 2:
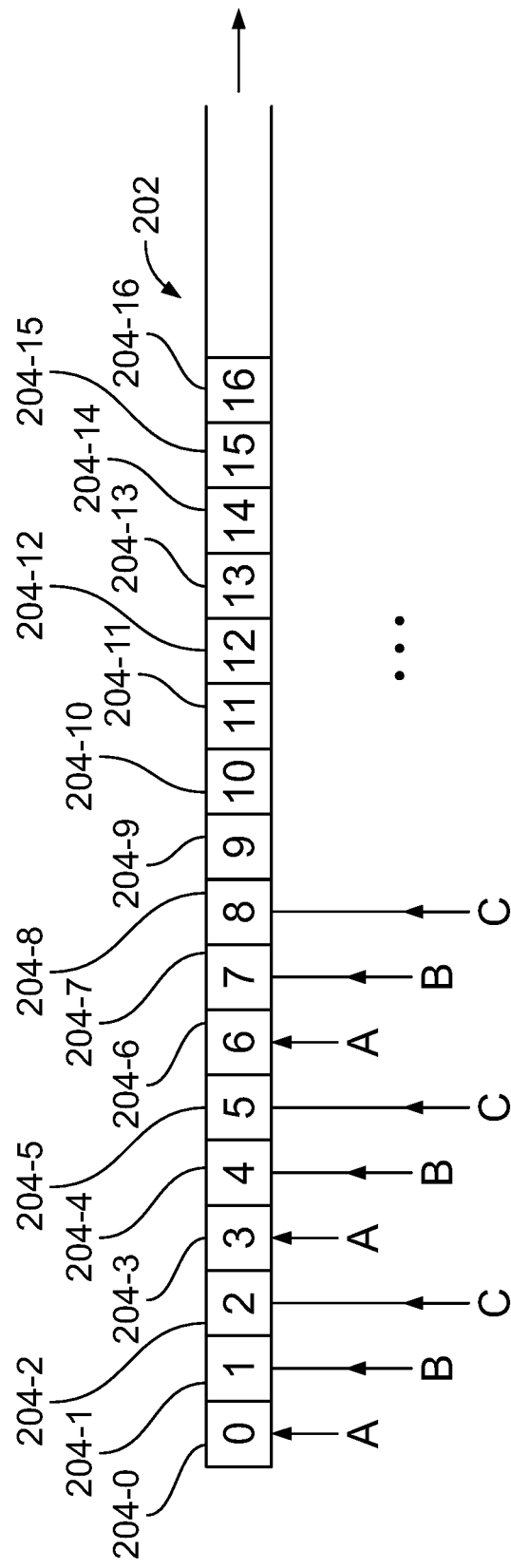
FIG. 2 illustrates an example in which a single random sequence is accessed by multiple rendering engines in an interleaved manner, according to at least one embodiment.

FIG. 2 illustrates an example of a common random sequence that may be accessed in an interleaved fashion by multiple rendering engines. For purposes of simplicity, the example of FIG. 2 will be described, by way of example, with reference to a common random sequence 202 that is accessed by a total of three rendering engines (e.g., three different rendering engines 130 of FIG. 1) in an interleaved manner. However, it is understood that more or less than three rendering engines can access the sequence 202 in a similar manner.

The random sequence 202 includes entries 204-0, 204-1, 204-2, 204-3, 204-4, 204-5, 204-6, 204-7, 204-8, 204-9, 204-10, 204-11, 204-12, 204-13, 204-14, 204-15, 204-16, etc., each of these entries carrying a respective value. For purposes of illustrated, indices of the entries are illustrated in FIG. 2. For example, FIG. 2 illustrates the index "0" of the entry 204-0, the index "1" of the entry 204-1, the index "2" of the entry 204-2, etc. In this regard, it is understood that such indices do not denote actual values of the random sequence, e.g., actual values that specify respective locations within a pixel. Rather, the indices merely represent positions of values within the sequence 202. In contrast, each value of the sequence 202 (e.g., the value carried at the index "0," the value carried at the index "1," the value carried at the index "2," etc.) may specify a location at which a ray is to be traced into the pixel.

The random sequence 202 may be an optimized, stratified random sequence. Different rendering engines may access entries of the random sequence 202 in an interleaved access order based on respective offsets. For example, if the number of rendering engines is equal to 3, then the entries in the random sequence 202 may be considered as being divided into 3 subsets or subgroups.

As illustrated in FIG. 2, a first rendering engine (rendering engine A) accesses a subset of entries of the sequence 202. The subset includes every third entry in the random sequence 202 beginning with the first sequential entry (e.g., entry 204-0, or entry 0). As such, the subset that is accessible by rendering engine A includes entries 204-0, 204-3, 204-6, 204-9, 204-12, 204-15, etc. Similarly, a second rendering engine (rendering engine B) accesses a different subset of entries of the sequence 202. The subset includes every third entry in the random sequence 202 beginning with the second sequential entry (e.g., entry 204-1, or entry 1). As such, the subset that is accessible by rendering engine B includes entries 204-1, 204-4, 204-7, 204-10, 204-13, 204-16, etc. Similarly, a third rendering engine (rendering engine C) accesses yet another subset of entries of the sequence 202. The subset includes every third entry in the random sequence 202 beginning with the third sequential entry (e.g., entry 204-2, or entry 2). As such, the subset that is accessible by rendering engine C includes entries 204-2, 204-5, 204-8, 204-11, 204-14, etc.

In this manner, values of multiple unique random sequences (e.g., values of the subset accessible by rendering engine A, values of the subset accessible by rendering engine B, and values of the subset accessible by rendering engine C) are effectively interleaved across values of the common random sequence 202. In an aspect, the rendering engines may access the random sequence based on its process ID and the number of rendering engines supported by the random sequence. For example, rendering engine A may have a process ID of 0 and the random sequence may support 3 rendering engines. In this example, rendering engine A may access index 0, and subsequent index locations incremented by 3 (the number of supported rendering engines). Similarly, rendering engine B may have a process ID of 1 and may access index 1 and subsequent index locations incremented by 3. Rendering engine C may have a process ID of 2 and may access index 2 and subsequent index locations incremented by 3.

It is understood that the division of the entries of the random sequence 202 may be performed in a different manner, e.g., to allow for accommodation of one or more additional rendering engines. For example, even when it is expected that the random sequence 202 will be accessed by a total of three rendering engines, the division may be performed to accommodate addition of a fourth rendering engine. In this situation, the first rendering engine (rendering engine A) may access a subset including every fourth entry in the random sequence 202 beginning with the first sequential entry (e.g., entry 204-0, or entry 0). As such, the subset that is accessible by rendering engine A may include entries 204-0, 204-4, 204-8, 204-12, 204-16, etc. The second rendering engine (rendering engine B) may access a subset including every fourth entry in the random sequence 202 beginning with the second sequential entry (e.g., entry 204-1, or entry 1). As such, the subset that is accessible by rendering engine B may include entries 204-1, 204-5, 204-9, 204-13, etc. The third rendering engine (rendering engine C) may access a subset including every fourth entry in the random sequence 202 beginning with the third sequential entry (e.g., entry 204-2, or entry 2). As such, the subset that is accessible by rendering engine C may include entries 204-2, 204-6, 204-10, 204-14, etc. In this manner, a different subset (including entries 204-3, 204-7, 204-11, 204-15, etc.) is reserved for a potential fourth rendering engine (rendering engine D). Although this example illustrates reserving a single subset for a potential fourth rendering engine, additional subsets may be reserved for additional rendering engines.

Multiple rendering engines may sample a specific pixel (e.g., at different times). However, if the rendering engines are controlled to sample the specific pixel at different locations of that pixel (e.g., by virtue of the locations being identified by differing random sequences), it is more likely that a sampled color for that pixel will be provided more quickly. A convergence speed of that pixel may be improved based on multiple rendering engines potentially sampling the pixel in conjunction with each other (as compared to a situation in which only a single rendering engine samples the pixel).

As described earlier, a separate merge process (e.g., merger 140) merges rendering results generated by each of multiple rendering engines (e.g., rendering engines 130) into a single image for transmission back to a front-end host (e.g., client 110) for display. The merge process may be performed by using a merge-filter function which is defined for each image. The merge-filter function may specify, for example, how to merge rendering results corresponding to a particular pixel of the image into a resulting pixel (e.g., a composite pixel) that is for display. Based on the merge-filter function, the merge process merges rendering results for the particular pixel, which are received from the rendering engines.

The merge-filter function may modify the type(s) of pixel information that is to be output by each rendering engine. However, computing logic that is employed by the rendering engines may be identical. For example, the rendering engines may all be performing rendering based on a Monte Carlo rendering of single-camera ray computation. Accordingly, all the rendering engines may produce rendering results using the same logic. As noted earlier, each rendering engine may sample a particular pixel in one or more distinct locations based on a random sequence. When a unique random sequence is generated for each rendering engine, a seed that is used for generating the random sequence may be different for each rendering engine. When a common random sequence is used (see, e.g., random sequence 202 of FIG. 2), an offset that is used for accessing entries of the random sequence may be different for each rendering engine.

According to at least one embodiment, the rendering engines need not communicate with each other while performing rendering operations. For example, with reference back to FIG. 1, the rendering engines 130 need not communicate with each other. Rather, the rendering engines 130 may receive instructions originating from the merger 140 (see, e.g., the dotted-line arrows leading from the merger 140 to each rendering engine 130). Accordingly, a linear performance gain based on the specifications of various host computers may be achieved.

According to at least one embodiment, each rendering engine is permitted to halt execution (by choice or due to an unforeseen event) at any time without critically impacting the overall rendering task. When a particular rendering engine halts execution, some render resources may be lost, which may cause the entire (or overall) performance of the system to slow. However, the overall performance of the rendering task may be continued by other rendering engines that remain active. Therefore, even if a majority of the rendering engines halts execution due to one or more reasons, the rendering task itself may be completed if, e.g., at least one rendering engine remains active. Accordingly, a robustness of the system is improved.

In single-machine Monte Carlo Raytracing (MCRT), rendering is halted (or deemed complete) once all the computed pixels have reached a certain level of mathematically-determined convergence or quality. In a multi-machine context, any one particular rendering engine may not be able to determine when to halt rendering operations. This is because it is likely that the particular rendering engine has only a portion of the information that is required to make such a determination. According to at least one embodiment, when multiple rendering engines (or hosts) are employed, a merge process (e.g., merger 140 of FIG. 1) makes the determination of whether rendering is deemed complete.

By way of example, the merge process inspects an entire image, to determine whether the image (e.g., the merged rendering results) meets a particular condition (e.g., a halting condition). Such a determination may be made, e.g., by inspecting the convergence or quality of each pixel. If the rendering results for a particular pixel achieve a particular quality level (e.g., a quality threshold specified by the artist), then the particular pixel is considered to be completed. As described earlier, the more samples that are traced into a pixel, the more the color of the resulting pixel should approximate the correct final color (the "ground truth"). In this regard, the artist may set a quality threshold governing how closely the computed color of the pixel is required to match the final color before the pixel can be considered as being completed.

In at least one embodiment, rendering is determined as being completed based on tracking a total number of pixel samples (uniform sampling case). Here, the total number of samples in each pixel may be tracked independently. Rendering may be determined as being completed when all pixels reach a maximum number of samples (e.g., a user-defined value). By way of example, such a maximum number of subpixel samples may be equal to 64 or 128.

In at least another embodiment, rendering is determined as being completed based on tracking pixel variance (adaptive sampling). Here, a value of pixel variance may be tracked for each pixel. If the pixel variance for each pixel is below a particular value (e.g., a user-defined value), then rendering may be determined as being completed. By way of example, such a value may be a value in a range between 0.0 and 1.0, where a smaller floating-point value effectively requires a higher level of quality or fidelity.

When all pixels of an image are considered to be completed, then the rendering task is considered to be complete. Between the rendering engines and the merge process, the merge process may be better able to make this determination because the merge process has better knowledge of all of the rendering results.

When the merge process determines that the merged rendering results meet the halting condition, the merge process instructs the rendering engines to halt the processing of the pixels of the image. For example, the merge process may send a "completed" order to all of the rendering engines (see, e.g., dotted-line arrows leading from merger 140 to rendering engines 130 in FIG. 1). Each rendering engine stops execution upon receiving such an order.

In the area of multi-machine rendering, according to one approach, tasks are dispatched based on image-area-based subdivision. For example, each rendering engine is assigned a sub-region(s) of the image and makes the halting determination for that sub-region(s) independently. Because a particular rendering engine computes its entire sub-region independently, the rendering process has knowledge of the information that is required to make the halting determination for that sub-region. However, before computing the sub-region, the rendering engine is unable to know how computationally complex the sub-region will be.

Therefore, when dynamically balancing tasks (or load-balancing) between different rendering engines, the above approach may require special care to adjust the dispatched tasks by communicating task-progress information back to a central dispatch (e.g., dispatch 120 of FIG. 1) and then configuring the central dispatch to adjust the sub-region(s) assigned to each rendering engine, in order to achieve a better load balancing. Alternatively, the central dispatch may be configured to subdivide an image into sufficiently small tiles such that a round-robin type of tile assignment can hide (or mask) an uneven load distribution because the variance in time to compute a given tile becomes sufficiently small. However, this approach increases the overhead that is performed for each rendering task, adds additional inter-process communication, and/or decreases the efficiency of parallelism. In addition, this approach requires exclusive task dispatch logic to add/remove regions to/from each rendering process.

In contrast, according to various embodiments of the present disclosure, communication between the rendering engines is not required during rendering, and thus parallel performance is not impacted.

Aspects of the present disclosure are directed to a method of distributing tasks (e.g., sampling locations within a particular pixel) to each of multiple rendering engines that are used to render an image. For example, each rendering engine may operate (or reside) at a respective computer (or host) of a plurality of computers. Aspects of the present disclosure are directed to addressing one or more of the following areas.

First, to extract a maximal (or maximum) level of system performance, the rendering engines are kept equally fully busy until the end of a rendering cycle. In the context of parallel computing, this issue may be referred to as load balancing, where multiple rendering engines are working to address problems of unequal complexity. One or more aspects are directed towards avoiding a situation in which one or more rendering engines completes its task(s) before other rendering engines, thereby sitting idly while the other rendering engines that may be operating on more difficult (or complex) parts of the problem continue to operate, resulting in diminished parallel speed-up.

In addition, it is appreciated that different computers hosting the rendering engines may not necessarily be homogenous. For example, the different computers hosting the rendering engines 130 of FIG. 1 may have different computing capabilities. Here, the different computers may employ a combination of processor types with different processor core-counts and/or different clock speeds. By distributing tasks according to one or more embodiments of the present disclosure, different computers having such different capabilities may be better accommodated.

In addition, it is appreciated that each rendering engine may begin rendering computations at a different time. According to at least one embodiment, the controlling of multiple rendering engines to perform computations (e.g., for a particular pixel) need not include controlling the rendering engines to begin performance of the computations at a same time (e.g., a same particular time). As such, according to one or more embodiments, synchronizing the rendering engines to begin rendering computations at a particular time is not necessarily required.

In addition, it is appreciated that each rendering engine is permitted to stop performing rendering computations at any time. As such, according to one or more embodiments, a particular rendering engine can, either by choice or due to an unforeseen event, safely exit performance of rendering computations at any time without significantly impacting (e.g., adversely impacting) the overall rendering task that is performed by one or more other rendering engines that remain.

Figure 3:
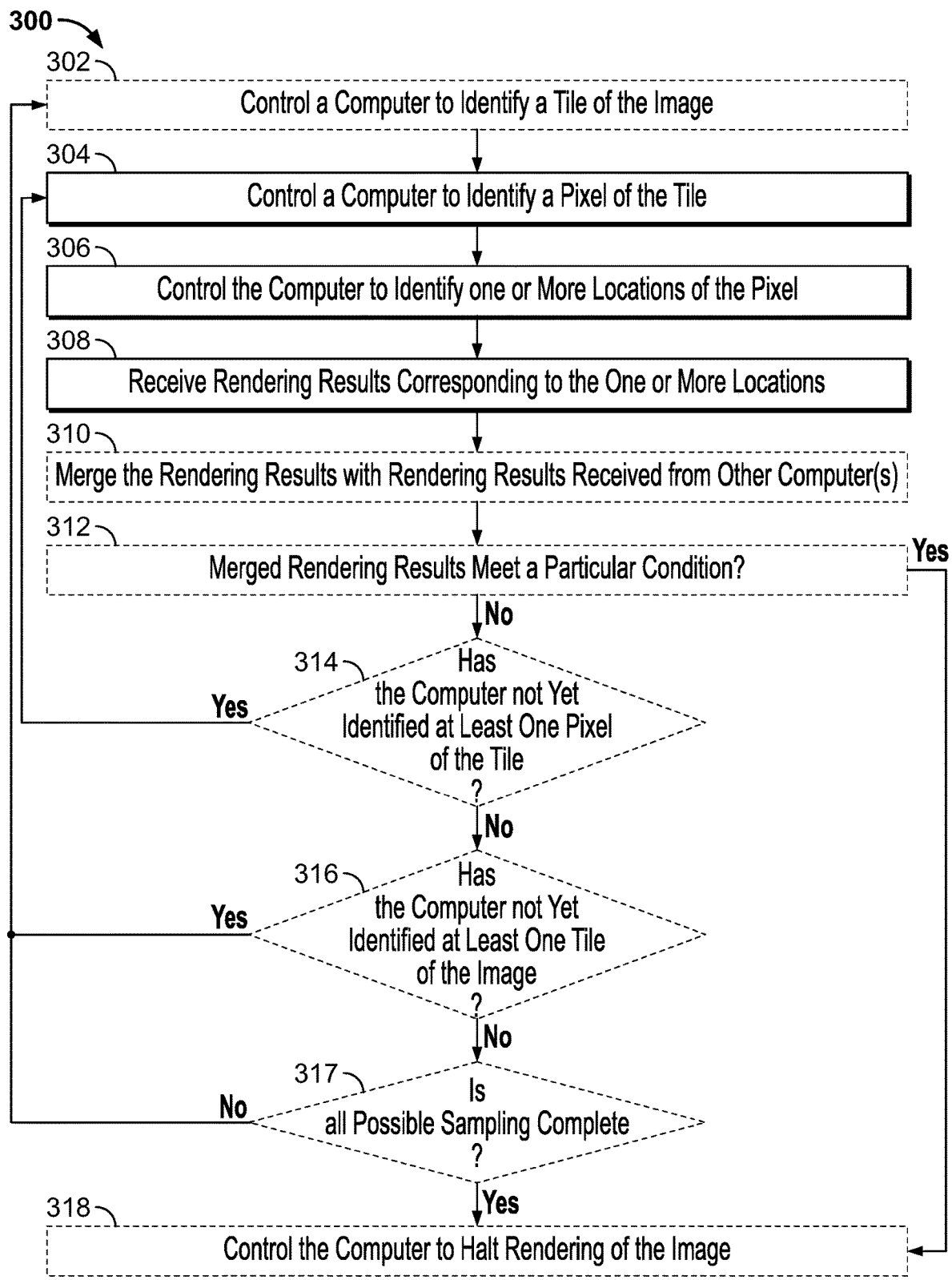
FIG. 3 illustrates a flowchart of a method of controlling rendering of a computer image at a plurality of computers according to at least one embodiment.

FIG. 3 illustrates a flowchart of a method 300 of controlling rendering of a computer image at a plurality of computers according to at least one embodiment.

At block 302, according to at least one particular embodiment, a computer (e.g., a first computer of the plurality of computers) is controlled to identify a tile of the image. For example, with reference to FIG. 1, a rendering engine 130 may be controlled to identify a tile of the image. The identification may be based on an inter-tile order that may be a random order that is generated, e.g., by random shuffling.

At block 304, the computer is controlled to identify a pixel of the tile identified at block 302. For example, with reference to FIG. 1, the rendering engine 130 may be controlled to identify a pixel of the tile. The identification may be based on an inter-pixel order that may be a random order that is generated, e.g., by random shuffling.

At block 306, the computer is controlled to identify one or more locations of the pixel identified at block 304. The identification of the one or more locations may be based on an intra-pixel computational order corresponding to the computer.

According to at least one particular embodiment, the intra-pixel computational order corresponding to the computer may be based on a random sequence different from and independent of a random sequence on which intra-pixel computational orders corresponding to other computers are based. For example, the intra-pixel computation order corresponding to the computer may be different from and independent of a random sequence on which an intra-pixel computational order corresponding to a second computer is based.

According to at least one particular embodiment, the intra-pixel computational order corresponding to the computer may be based on a common random sequence on which an intra-pixel computational order corresponding to the second computer is also based. For example, the intra-pixel computational order may be based on a common random sequence such as the random sequence 202 of FIG. 2. In this situation, the intra-pixel computational order corresponding to the computer may be formed by non-contiguous entries of the random sequence (e.g., entries 204-0, 204-3, 204-6, 204-9, 204-12, 204-15, etc., of the random sequence 202).

At block 308, rendering results corresponding to the location(s) identified at block 306 are received from the computer. For example, with reference to FIG. 1, the received rendering results may be received by the merger 140.

At block 310, according to at least one particular embodiment, the received rendering results are merged with rendering results received from one or more other computers (e.g., one or more other rendering engines 130 of FIG. 1), such as a second computer. For example, with reference to FIG. 1, the received rendering results are merged at the merger 140.

At block 312, according to at least one particular embodiment, it is determined whether the merged rendering results meet a particular condition. For example, with reference to FIG. 1, the merger 140 determines whether the merged rendering results meet a particular condition.

According to at least one particular embodiment, the particular condition is based on an image quality threshold that is specified by a user.

If it is determined that the merged rendering results meet the particular condition, the computer is controlled to halt rendering operations (see block 318). Otherwise, the method may proceed to block 314.

At block 314, it may be determined whether the computer has not yet identified at least one pixel of the tile that had been identified at block 302. If the computer has not yet identified at least one such pixel, the method may return to block 304, such that a different pixel of the tile identified at block 302 can be identified. Otherwise (e.g., the computer has identified all pixels of the tile), the method may proceed to block 316. Alternatively, in some particular situations (e.g., during a coarse pass), the method may proceed to block 316 even if at least one pixel of the tile is not yet processed at some iteration.

With regards to returning to block 304 (e.g., during a second iteration), the computer may be controlled to identify a second pixel of the tile of the computer image based on the inter-pixel order.

The computer may be controlled to identify one or more locations of the second pixel, to facilitate sampling of the second pixel at the one or more locations of the second pixel (see, e.g., block 306). The identification of the one or more locations of the second pixel may be based on the intra-pixel computational order corresponding to the computer.

According to at least a particular embodiment, the computer is controlled such that the one or more locations of the second pixel is greater in number than the one or more locations of the first pixel. For example, the computer may be controlled such that a number of the one or more locations of the second pixel is an integer multiple of a number of the one or more locations of the first pixel. That is, at the intra-pixel level (or subpixel level), the sampling may occur in stages or iterations.

By way of example, during a first iteration in which the first pixel was identified, only one location (e.g., the location carried by entry 204-0 of the random sequence 202 of FIG. 2) may have been identified for purposes of sampling the first pixel. This iteration may be referred to as a coarse pass that is configured for producing rendering results more quickly.

During a second iteration in which the second pixel is identified, a larger number of locations may be identified. For example, two locations (e.g., the respective locations carried by entries 204-3 and 204-6 of the random sequence 202 of FIG. 2) may be identified for purposes of sampling the second pixel. The second iteration (as well as further iterations) may be referred to as a finer pass that is configured for producing rendering results based on a greater amount of information. Here, it is understood, that a third iteration (e.g., in which a third pixel is identified) and a fourth iteration (e.g., in which a fourth pixel is identified) may include identifying four locations of the third pixel and eight locations of the fourth pixel, respectively. These iterations may continue for N iterations until a halt condition, as previously described, is reached as determined by the merge process.

Second rendering results corresponding to the one or more locations (e.g., two locations) of the second pixel may be received (see block 308).

The second rendering results may be merged with second rendering results received from at least the second computer (see block 310).

It may be determined whether the merged second rendering results meet the particular condition (see block 312).

If it is determined that the merged second rendering results meet the particular condition, the computer is controlled to halt rendering operations (see block 318). Otherwise, the method may proceed to block 314.

At block 314, it may be determined whether the computer has not yet identified at least one pixel of the tile that had been identified at block 302. If the computer has not yet identified at least one such pixel, the method may return to block 304. Otherwise (e.g., the computer has identified all pixels of the tile), the method may proceed to block 316.

At block 316, it may be determined whether the computer has not yet identified at least one tile of the image (e.g., whether all tiles are not yet completed). If the computer has not yet identified at least one such tile (e.g., all tiles are not yet completed), the method may return to block 302, such that a different tile of the image can be identified. Otherwise, the method may proceed to block 317. At block 317, it may be determined whether all possible sampling is complete. If possible sampling remains to be executed, then the method returns to block 302. Otherwise, the method proceeds to block 318.

Figure 4:
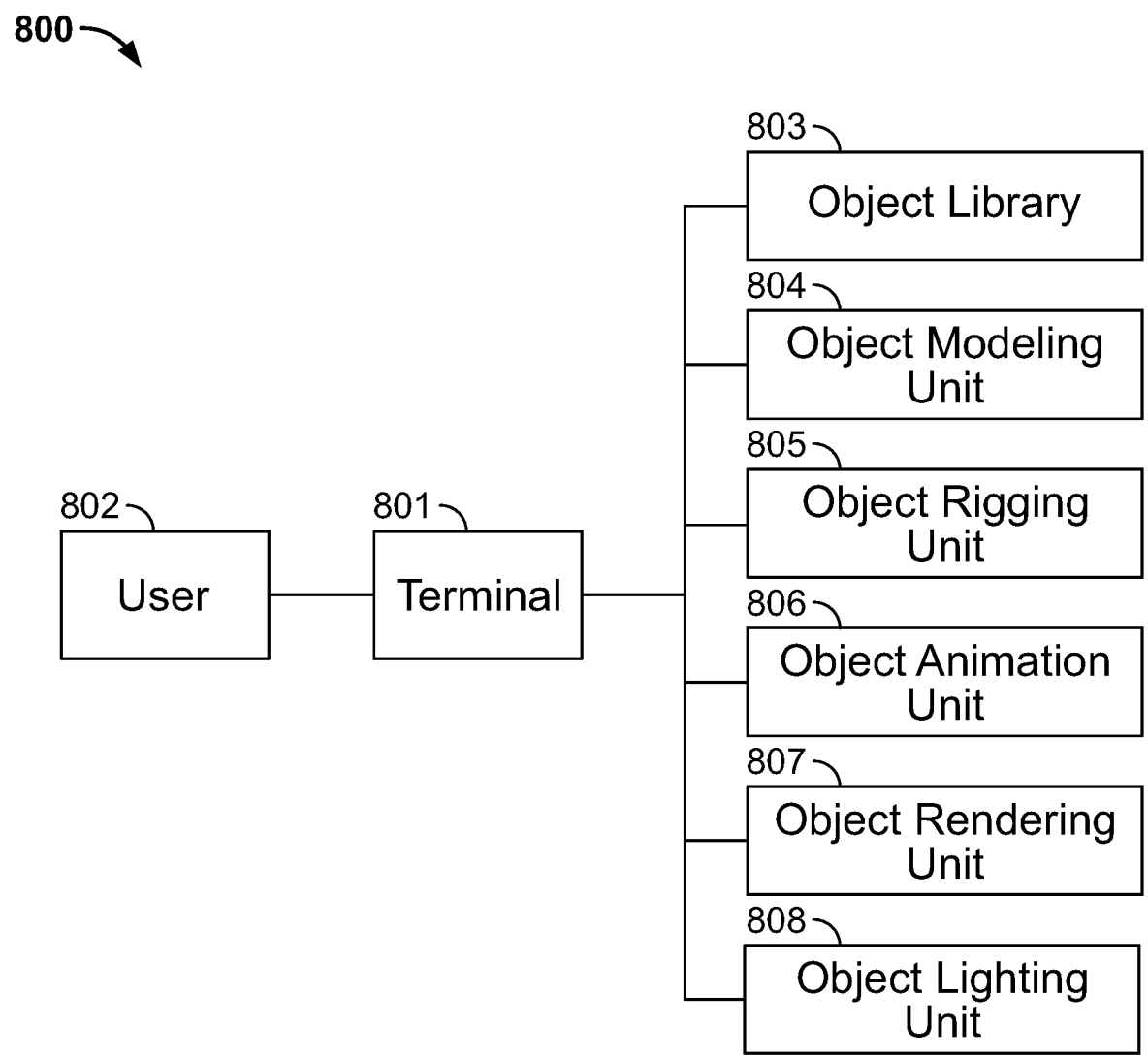
FIG. 4 is an illustration of a computing environment according to at least one embodiment.

Referring now to FIG. 4, a simplified block diagram of a system 800 for creating computer graphics imagery (CGI) and computer-aided animation is shown that may implement or incorporate various embodiments of the present disclosure. The system 800 may include one or more terminals 801. The one or more terminals 801 may include hardware and software elements configured for designing CGI and assisting with computer-aided animation. The terminals 801 may be implemented as a single computing device or a set of one or more computing devices, corresponding to computer hardware and/or software.

Examples of terminals 801 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 801 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 800, a user 802 may utilize the one or more terminals 801 to design, create, or modify objects within a computer-generated interface displayed on display associated with the terminal 801.

The terminal may implement, include, or otherwise be in operable communication with, systems and units including object library 803, object modeling unit 804, object rigging unit 805, object animation unit 806, object rendering unit 807, and object lighting unit 808. Object library 803 may include software and/or hardware elements configured for storing and accessing information related to objects to be accessed, requested, retrieved, and/or used by the one or more terminals 801 to design, create, and modify models (e.g., 3D models) of objects in the CGI and animation processes.

Object modeling unit 804 may include software and/or hardware elements and information to be accessed, requested, retrieved, and/or used by the one or more terminals 801 to sculpt and design the 3D model to take on the desired appearance as instructed by user 802, or other terminal operator during the CGI and animation process.

Object rigging unit 805 may include software and/or hardware elements and information to be accessed, requested, retrieved, and/or used by the one or more terminals 801 to design, create, or modify components of 3D models to define articulation points and movement ranges of various elements of the 3D model.

Object animation unit 806 may include software and/or hardware elements and information to be accessed, requested, retrieved, and/or used by the one or more terminals 801 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 807 may include software and/or hardware elements and information to be accessed, requested, retrieved, and/or used by the one or more terminals 801 to design, create, or modify a final appearance of the animated 3D model, including generating one or more images of one or more computer-generated objects, including textures, colors, rigging, controls, and the like.

Object lighting unit 808 may include software and/or hardware elements and information to be accessed, requested, retrieved, and/or used by the one or more terminals 801 to design, create, or modify lighting aspects of a 3D model and animated scenes, including defining lighting sources, shading, reflections, refractions, textures, colors, and the like.

The one or more terminals 801 may be in communication with one or more server computers which may operatively be in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 803, object modeling unit 804, object rigging unit 805, object animation unit 806, object rendering unit 807, object lighting unit 808, and the like. The one or more terminals 801, the one or more server computers, or any other aspect of the system 800, may be associated or coupled with a display configured to display information, including a displayed interface for displaying, performing, executing, instructing, reviewing, and/or selecting operations of the present disclosure.

Figure 5:
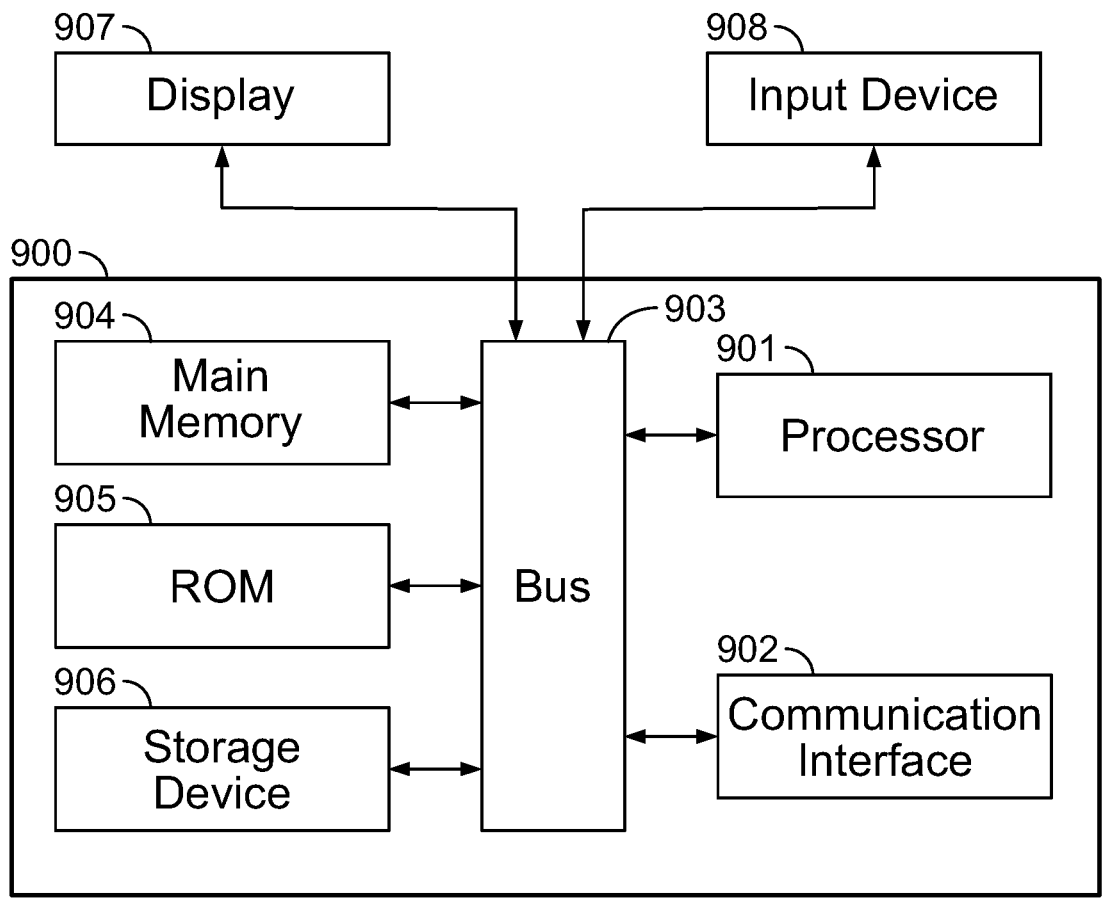
FIG. 5 is a block diagram of a device according to at least one embodiment.

Referring to FIG. 5, an illustration of an example computer 900 is provided. One or more of aspects of the system 800 discussed above in FIG. 4, such as the one or more terminals 801 or the one or more server computers, may be configured as or include such a computer 900. In selected embodiments, the computer 900 may include a bus 903 (or multiple buses) or other communication mechanism, a processor 901, main memory 904, read only memory (ROM) 905, one or more additional storage devices 906, and/or a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. The processor 901 may be connected to the bus 903 and process information. In selected embodiments, the processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to the bus 903 and store information and instructions to be executed by the processor 901. Main memory 904 may also store temporary variables or other intermediate information during execution of such instructions.

ROM 905 or some other static storage device may be connected to a bus 903 and store static information and instructions for the processor 901. An additional storage device 906 (e.g., a magnetic disk, optical disk, memory card, or the like) may be connected to the bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to the bus 903. A communication interface 902 may provide or support two-way data communication between a computer 900 and one or more external devices (e.g., other devices contained within the computing environment).

In selected embodiments, the computer 900 may be connected (e.g., via a bus) to a display 907. The display 907 may use any suitable mechanism to communicate information to a user of a computer 900. For example, the display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone, stylus pen) may be connected to the bus 903 to communicate information and commands to the computer 900. In selected embodiments, one input device 908 may provide or support control over the positioning of a cursor to allow for selection and execution of various objects, files, programs, and the like provided by the computer 900 and displayed by the display 907.

The computer 900 may be used to transmit, receive, decode, display, or the like one or more video files. In selected embodiments, such transmitting, receiving, decoding, and displaying may be in response to the processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause the processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, the computer 900 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of controlling rendering of a computer image at a plurality of computers, the method comprising:

controlling a first computer of the plurality of computers to identify a pixel of a tile of the computer image, wherein the identification of the pixel is based on an inter-pixel order;

controlling the first computer to identify one or more locations of the pixel, to facilitate sampling of the pixel at the one or more locations thereof, wherein the identification of the one or more locations is based on an intra-pixel computational order corresponding to the first computer; and receiving rendering results corresponding to the one or more locations of the pixel, wherein the rendering results comprise merged rendering results from the first computer and at least a second computer of the plurality of computers, wherein the merged rendering results are based on the intra-pixel computational order corresponding to the first computer and a second intra-pixel computational order corresponding to the second computer, and wherein the intra-pixel computational order corresponding to the first computer is based on a first sequence different from a second sequence on which the second intra-pixel computational order corresponding to the second computer is based.

2. The method of claim 1, further comprising:

controlling the first computer to identify the tile from a plurality of tiles of the computer image based on an inter-tile order.

3. The method of claim 1, wherein the intra-pixel computational order corresponding to the first computer is based on a first random sequence different from and independent of a second random sequence on which the second intra-pixel computational order corresponding to the second computer is based.

4. The method of claim 1, wherein the intra-pixel computational order corresponding to the first computer is based on a common random sequence on which the second intra-pixel computational order corresponding to the second computer is also based.

5. The method of claim 4, wherein the intra-pixel computational order corresponding to the first computer is formed by non-contiguous entries of the common random sequence.

6. A machine-readable non-transitory medium having stored thereon machine-executable instructions for controlling rendering of a computer image at a plurality of computers, the instructions comprising:

controlling a first computer of the plurality of computers to identify a pixel of a tile of the computer image, wherein the identification of the pixel is based on an inter-pixel order;

controlling the first computer to identify one or more locations of the pixel, to facilitate sampling of the pixel at the one or more locations thereof, wherein the identification of the one or more locations is based on an intra-pixel computational order corresponding to the first computer; and receiving rendering results corresponding to the one or more locations of the pixel, wherein the rendering results comprise merged rendering results from the first computer and at least a second computer of the plurality of computers, wherein the merged rendering results are based on the intra-pixel computational order corresponding to the first computer and a second intra-pixel computational order corresponding to the second computer, and wherein the intra-pixel computational order corresponding to the first computer is based on a first sequence different from a second sequence on which the second intra-pixel computational order corresponding to the second computer is based.

7. The machine-readable non-transitory medium of claim 6, wherein the intra-pixel computational order corresponding to the first computer is based on a first random sequence different from and independent of a second random sequence on which the intra-pixel computational order corresponding to the second computer is based.

8. The machine-readable non-transitory medium of claim 6,
wherein the intra-pixel computational order corresponding to the first computer is based on a common random sequence on which the second intra-pixel computational order corresponding to the second computer is also based, and
wherein the intra-pixel computational order corresponding to the first computer is formed by non-contiguous entries of the common random sequence.

9. A system for controlling rendering of a computer image at a plurality of computers, the system comprising one or more controllers configured to:
control a first computer of the plurality of computers to identify a pixel of a tile of the computer image, wherein the identification of the pixel is based on an inter-pixel order;
control the first computer to identify one or more locations of the pixel, to facilitate sampling of the pixel at the one or more locations thereof, wherein the identification of the one or more locations is based on an intra-pixel computational order corresponding to the first computer; and
receive rendering results corresponding to the one or more locations of the pixel,
wherein the rendering results comprise merged rendering results from the first computer and at least a second computer of the plurality of computers,
wherein the merged rendering results are based on the intra-pixel computational order corresponding to the first computer and a second intra-pixel computational order corresponding to the second computer, and
wherein the intra-pixel computational order corresponding to the first computer is based on a first sequence different from a second sequence on which the second intra-pixel computational order corresponding to the second computer is based.

10. A method of controlling rendering of a computer image at a plurality of computers, the method comprising:
controlling a first computer of the plurality of computers to identify a pixel of a tile of the computer image, wherein the identification of the pixel is based on an inter-pixel order;
controlling the first computer to identify one or more locations of the pixel, to facilitate sampling of the pixel at the one or more locations thereof, wherein the identification of the one or more locations is based on an intra-pixel computational order corresponding to the first computer;
receiving rendering results corresponding to the one or more locations of the pixel,
wherein the rendering results comprise merged rendering results from the first computer and at least a second computer of the plurality of computers; and
determining whether merged rendering results meet a particular condition.

11. The method of claim 10, further comprising:
in response to determining that the merged rendering results meet the particular condition, instructing each computer of the plurality of computers to halt the rendering of the computer image.

12. The method of claim 11, wherein the particular condition is based on an image quality threshold that is specified by a user.

13. The method of claim 10, further comprising:
in response to determining that the merged rendering results do not meet the particular condition:
controlling the first computer to identify a second pixel of the tile of the computer image, wherein the identification of the second pixel is based on the inter-pixel order;
controlling the first computer to identify one or more locations of the second pixel, to facilitate sampling of the second pixel at the one or more locations thereof,
wherein the identification of the one or more locations of the second pixel is based on the intra-pixel computational order corresponding to the first computer; and
receiving second merged rendering results corresponding to the one or more locations of the second pixel.

14. The method of claim 13, wherein the first computer is controlled such that the one or more locations of the second pixel is greater in number than the one or more locations of the pixel.

15. The method of claim 14, wherein the first computer is controlled such that a number of the one or more locations of the second pixel is an integer multiple of a number of the one or more locations of the pixel.

16. A machine-readable non-transitory medium having stored thereon machine-executable instructions for controlling rendering of a computer image at a plurality of computers, the instructions comprising:
controlling a first computer of the plurality of computers to identify a pixel of a tile of the computer image, wherein the identification of the pixel is based on an inter-pixel order;
controlling the first computer to identify one or more locations of the pixel, to facilitate sampling of the pixel at the one or more locations thereof, wherein the identification of the one or more locations is based on an intra-pixel computational order corresponding to the first computer;
receiving rendering results corresponding to the one or more locations of the pixel,
wherein the rendering results comprise merged rendering results from the first computer and at least a second computer of the plurality of computers; and
determining whether merged rendering results meet a particular condition.

17. The machine-readable non-transitory medium of claim 16, wherein the instructions further comprise:
in response to determining that the merged rendering results meet the particular condition, instructing each computer of the plurality of computers to halt the rendering of the computer image.

18. The machine-readable non-transitory medium of claim 16, wherein the instructions further comprise:
> in response to determining that the merged rendering results do not meet the particular condition:
>> controlling the first computer to identify a second pixel of the tile of the computer image, wherein the identification of the second pixel is based on the inter-pixel order;
>> controlling the first computer to identify one or more locations of the second pixel, to facilitate sampling of the second pixel at the one or more locations thereof, wherein the identification of the one or more locations of the second pixel is based on the intra-pixel computational order corresponding to the first computer; and
>> receiving second merged rendering results corresponding to the one or more locations of the second pixel.

19. The machine-readable non-transitory medium of claim 18, wherein the first computer is controlled such that the one or more locations of the second pixel is greater in number than the one or more locations of the pixel.

\* \* \* \* \*